United States Patent
Niimi

(10) Patent No.: US 9,150,276 B2
(45) Date of Patent: Oct. 6, 2015

(54) SADDLE-RIDE TYPE VEHICLE

(71) Applicant: YAMAHA HATSUDOKI KABUSHIKI KAISHA, Iwata-shi, Shizuoka (JP)

(72) Inventor: Hiroshi Niimi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/449,230

(22) Filed: Aug. 1, 2014

(65) Prior Publication Data

US 2015/0114742 A1    Apr. 30, 2015

(30) Foreign Application Priority Data

Oct. 31, 2013  (JP) ................................ 2013-226882

(51) Int. Cl.
*B62L 3/00* (2006.01)
*B62L 3/02* (2006.01)
*B62K 11/04* (2006.01)
*B60T 8/36* (2006.01)
*B62K 19/38* (2006.01)

(52) U.S. Cl.
CPC .............. *B62L 3/023* (2013.01); *B60T 8/3685* (2013.01); *B62K 11/04* (2013.01); *B62K 19/38* (2013.01); *B62L 3/00* (2013.01)

(58) Field of Classification Search
CPC ............ B62L 3/02; B62L 3/023; B62L 3/00; B60T 8/3685
USPC ........................................................ 180/219
See application file for complete search history.

(56) References Cited

U.S. PATENT DOCUMENTS

| 2007/0188012 | A1* | 8/2007 | Hariu et al. ................. 303/3 |
| 2008/0078601 | A1* | 4/2008 | Miki et al. .................. 180/219 |
| 2009/0243378 | A1* | 10/2009 | Ito et al. ..................... 303/28 |
| 2010/0071985 | A1* | 3/2010 | Harada ....................... 180/219 |
| 2015/0041232 | A1* | 2/2015 | Takatsuka et al. ........... 180/219 |

FOREIGN PATENT DOCUMENTS

| EP | 2 404 796 A1 | 1/2012 |
| JP | 2008-74206 A | 4/2008 |
| JP | 2012-210849 A | 11/2012 |
| JP | 2013-71589 A | 4/2013 |

OTHER PUBLICATIONS

Official Communication issued in corresponding European Patent Application No. 14181988.8, mailed on Mar. 11, 2015.

* cited by examiner

*Primary Examiner* — Kevin Hurley
(74) *Attorney, Agent, or Firm* — Keating & Bennett, LLP

(57) ABSTRACT

A saddle-ride type vehicle includes a frame, an engine, a wheel support device, a wheel, upstream and downstream brake hoses, a brake device, a master cylinder, and a fluid pressure control device. The brake device is mounted to the wheel support device. The brake device is configured to brake the wheel by brake fluid being fed thereto from the downstream brake hose. The master cylinder is configured to feed the brake fluid to the upstream brake hose. The fluid pressure control device includes a brake hose connecting portion to which the upstream and downstream brake hoses are connected. The frame includes a head pipe, a main frame, a first down frame, and a second down frame. The fluid pressure control device is disposed either between the main frame and the first down frame, or between the main frame and the second down frame in the vehicle top view.

17 Claims, 8 Drawing Sheets

SADDLE-RIDE TYPE VEHICLE

BACKGROUND OF THE INVENTION

1. Field of the Invention

The present invention relates to a saddle-ride type vehicle.

2. Description of the Related Art

A well-known type of motorcycle is equipped with a fluid pressure control device for an ABS (Antilock Brake System). Brake hoses are connected to the fluid pressure control device, and respectively extend from a front wheel brake master cylinder, a rear wheel brake master cylinder, a front wheel brake caliper, and a rear wheel brake caliper.

A method of disposing the fluid pressure control device in a position rearward of a head pipe has been disclosed as a layout method of the fluid pressure control device (see Japan Laid-open Patent Application Publication No. JP-A-2008-74206).

Specifically, Japan Laid-open Patent Application Publication No. JP-A-2008-74206 describes a layout method in which the fluid pressure control device is disposed in a space enclosed by a pair of main frames and a pair of down frames. The main frames extend rearwardly from the head pipe, while extending outwardly to the right and left. The down frames are disposed under the main frames. Further, the down frames extend rearwardly from the head pipe, while extending outwardly to the right and left. The fluid pressure control device is a relatively heavy component. Therefore, the liquid pressure control device is disposed in the middle of the vehicle in the width direction. With this layout, the space defined rearward of the head pipe is effectively utilized.

However, in Japan Laid-open Patent Application Publication No. JP-A-2008-74206, the head pipe is relatively short, and base end portions of the pair of main frames and those of the pair of down frames are disposed closely to each other. In other words, the space for disposing the fluid pressure control device is small. This causes a drawback that when connecting the brake hoses to the fluid pressure control device, the main frames and the down frames interfere with a tool, and thus, workability when installing the brake hoses is deteriorated. Such a drawback becomes remarkable when using a structure in which a single main frame extends straight rearward from the head pipe.

Moreover, when the fluid pressure control device is disposed under the main frames, a clearance is reduced between the fluid pressure control device and the engine. Therefore, accessibility to the upper portion of the engine deteriorates when the engine is mounted in the vehicle. In other words, maintenance performance of the engine inevitably deteriorates.

SUMMARY OF THE INVENTION

Preferred embodiments of the present invention have been conceived in view of the situation described above. A preferred embodiment of the present invention provides a saddle-ride type vehicle in which workability of installing the brake hoses and maintenance performance of an engine are enhanced.

A saddle-ride type vehicle according to a first aspect of various preferred embodiments of the present invention includes a frame, an engine, a wheel support device, a wheel, upstream and downstream brake hoses, a brake device, a master cylinder, and a fluid pressure control device. The engine is supported by the frame. The wheel support device is coupled to the frame. The wheel is rotatably supported by the wheel support device. The upstream and downstream brake hoses respectively contain a brake fluid sealed therein. The brake device is mounted to the wheel support device. The brake device is configured to brake the wheel by the brake fluid being fed thereto from the downstream brake hose. The master cylinder is configured to feed the brake fluid to the upstream brake hose. The fluid pressure control device includes a brake hose connecting portion to which the upstream and downstream brake hoses are connected. The fluid pressure control device is configured to control a fluid pressure of the brake fluid in the downstream brake hose. The frame includes a head pipe, a main frame, a first down frame, and a second down frame. The head pipe extends in an up-and-down direction. The main frame extends rearward from the head pipe. The first and second down frames respectively extend rearward from the head pipe and under the main frame. The main frame is disposed between the first down frame and the second down frame in a vehicle top view. The fluid pressure control device is disposed either between the main frame and the first down frame, or between the main frame and the second down frame in the vehicle top view. The fluid pressure control device at least partially overlaps with the main frame in a vehicle side view. The fluid pressure control device is partially disposed in a space defined by the main frame, the first down frame, and the second down frame. The brake hose connecting portion is located outside the space.

According to the saddle-ride type vehicle of the first aspect of various preferred embodiments of the present invention, the fluid pressure control device is partially disposed in the space defined by the main frame, the first down frame, and the second down frame. Therefore, a space produced rearward of the head pipe is effectively utilized. On the other hand, the brake hose connecting portion is located outside the space. Therefore, it is possible to enhance workability when installing the upstream and downstream brake hoses. Further, the fluid pressure control device is disposed between the main frame and the first down frame in the vehicle top view and disposed at a high position so as to overlap with the main frame in the vehicle side view. A large clearance is thus provided between the fluid pressure control device and the engine. Therefore, it is possible to reliably achieve good accessibility to the upper portion of the engine. In other words, maintenance performance of the engine is enhanced. Consequently, it is possible to enhance workability when installing the brake hose (the upstream brake hose, the downstream brake hose) and maintenance performance of the engine.

A saddle-ride type vehicle according to a second aspect of various preferred embodiments of the present invention relates to the saddle-ride type vehicle according to the first aspect, and further includes an engine attachment member attached to an upper portion of the engine.

According to the saddle-ride type vehicle of the second aspect of various preferred embodiments of the present invention, a space is reliably provided above the engine attachment member. Therefore, it is possible to achieve good accessibility to the engine attachment member. In other words, maintenance performance of the engine is enhanced.

A saddle-ride type vehicle according to a third aspect of various preferred embodiments of the present invention relates to the saddle-ride type vehicle according to the first or second aspects, and wherein the vehicle is divided into a first region and a second region in a vehicle width direction with reference to a vehicle center line extending in a vehicle back-and-forth direction in the vehicle top view, and the brake device and the fluid pressure control device are disposed in the first region.

According to the saddle-ride type vehicle of the third aspect of various preferred embodiments of the present invention, the brake device and the fluid pressure control device are disposed in the same region (i.e., the first region). Therefore, the downstream brake hose is not required to be mounted astride the main frame when installing the downstream brake hose. In other words, it is easy to install the brake hose.

A saddle-ride type vehicle according to a fourth aspect of various preferred embodiments of the present invention relates to the saddle-ride type vehicle according to the third aspect, and wherein the downstream brake hose is disposed in the first region.

According to the saddle-ride type vehicle of the fourth aspect of various preferred embodiments of the present invention, the downstream brake hose is disposed in the same region (i.e., the first region) as the brake device. Therefore, an increase in the entire length of the downstream brake hose is prevented in comparison with a structure in which the downstream brake hose is mounted astride the main frame.

A saddle-ride type vehicle according to a fifth aspect of various preferred embodiments of the present invention relates to the saddle-ride type vehicle according to the first or second aspects, and wherein the vehicle is divided into a first region and a second region in a vehicle width direction with reference to a vehicle center line extending in a vehicle back-and-forth direction in the vehicle top view, and the master cylinder and the fluid pressure control device are disposed in the first region.

According to the saddle-ride type vehicle of the fifth aspect of various preferred embodiments of the present invention, the master cylinder and the fluid pressure control device are disposed in the same region (i.e., the first region). Therefore, the upstream brake hose is not required to be mounted astride the main frame when installing the upstream brake hose. In other words, it is easy to install the upstream brake hose.

A saddle-ride type vehicle according to a sixth aspect of various preferred embodiments of the present invention relates to the saddle-ride type vehicle according to the fifth aspect, and wherein the upstream brake hose is disposed in the first region.

According to the saddle-ride type vehicle of the sixth aspect of various preferred embodiments of the present invention, the upstream brake hose is disposed in the same region (i.e., the first region) as the master cylinder. Therefore, an increase in the entire length of the upstream brake hose is prevented in comparison with a structure in which the brake hose is mounted astride the main frame.

A saddle-ride type vehicle according to a seventh aspect of various preferred embodiments of the present invention relates to the saddle-ride type vehicle according to of the first to sixth aspects, and wherein the wheel is disposed in any a rear portion of the vehicle.

According to the saddle-ride type vehicle of the seventh aspect of various preferred embodiments of the present invention, it is possible to enhance workability when installing the rear wheel brake hose extending from the rear wheel brake device to the fluid pressure control device.

A saddle-ride type vehicle according to an eighth aspect of various preferred embodiments of the present invention relates to the saddle-ride type vehicle according to the seventh aspect, and wherein the fluid pressure control device includes a brake fluid flow path unit including the brake hose connecting portion. A flow path of the brake fluid is inside the brake fluid flow path. The brake hose connecting portion of the fluid pressure control device includes a first attachment hole located rearward of a middle of the brake fluid flow path unit in the vehicle back-and-forth direction. At least one of the upstream and downstream brake hoses is connected to the first attachment hole.

According to the saddle-ride type vehicle of the eighth aspect of various preferred embodiments of the present invention, the first attachment hole is located rearward of the middle of the brake fluid flow path unit in the vehicle back-and-forth direction. Therefore, the rear wheel brake hose is unlikely to interfere with the fluid pressure control device or another member attached to the fluid pressure control device in comparison with a structure in which the first attachment hole is located forward of the middle of the brake fluid flow path unit in the vehicle back-and-forth direction. In other words, it is possible to easily install the rear wheel brake hose. Further, an increase in the entire length of the rear wheel brake hose is prevented.

A saddle-ride type vehicle according to a ninth aspect of various preferred embodiments of the present invention relates to the saddle-ride type vehicle according to any of the first to sixth aspects, and wherein the wheel is disposed in a front portion of the vehicle.

According to the saddle-ride type vehicle of the ninth aspect of various preferred embodiments of the present invention, it is possible to enhance workability when installing the front wheel brake hose extending from the front wheel brake device to the fluid pressure control device.

A saddle-ride type vehicle according to a tenth aspect of various preferred embodiments of the present invention relates to the saddle-ride type vehicle according to the ninth aspect, and wherein the fluid pressure control device includes a brake fluid flow path unit including the brake hose connecting portion. A flow path of the brake fluid is inside the brake fluid flow path. The brake hose connecting portion of the fluid pressure control device includes a second attachment hole located forward of a middle of the brake fluid flow path unit in the vehicle back-and-forth direction. At least one of the upstream and downstream brake hoses is connected to the second attachment hole.

According to the saddle-ride type vehicle of the tenth aspect of various preferred embodiments of the present invention, the second attachment hole is located forward of the middle of the brake fluid flow path unit in the vehicle back-and-forth direction. Therefore, the front wheel brake hose is unlikely to interfere with the fluid pressure control device and another member attached to the fluid pressure control device in comparison with a structure in which the second attachment hole is located rearward of the middle of the brake fluid flow path unit in the vehicle back-and-forth direction. Therefore, it is possible to easily install the front wheel brake hose. Further, an increase in the entire length of the front wheel brake hose is prevented.

A saddle-ride type vehicle according to an eleventh aspect of various preferred embodiments of the present invention relates to the saddle-ride type vehicle according to any of the first to tenth aspects, and wherein a lower end of the fluid pressure control device is located higher than a lower end of the head pipe in the vehicle side view.

According to the saddle-ride type vehicle of the eleventh aspect of various preferred embodiments of the present invention, the lower end of the fluid pressure control device is located higher than that of the head pipe in the vehicle side view. Therefore, the fluid pressure control device is disposed at a sufficiently high position. Hence, a large clearance is provided between the fluid pressure control device and the engine.

A saddle-ride type vehicle according to a twelfth aspect of various preferred embodiments of the present invention relates to the saddle-ride type vehicle according to any of the first to eleventh aspects, and further includes a fuel tank disposed above the fluid pressure control device and the main frame. Further, a top surface of the fluid pressure control device is located lower than an upper end of the main frame when viewed in a cross-section taken perpendicular to the vehicle back-and-forth direction.

According to the saddle-ride type vehicle of the twelfth aspect of various preferred embodiments of the present invention, the fluid pressure control device does not protrude upward of the main frame. Therefore, a reduction in the capacity of the fuel tank is prevented.

A saddle-ride type vehicle according to a thirteenth aspect of various preferred embodiments of the present invention relates to the saddle-ride type vehicle according to any of the first to twelfth aspects, and further includes a reinforcement frame connecting the main frame and the head pipe and being located under the main frame.

According to the saddle-ride type vehicle of the thirteenth aspect of various preferred embodiments of the present invention, the reinforcement frame is disposed under the main frame. Therefore, the strength required for the main frame is reduced. It is thus possible to enhance the flexibility in the design of the shapes and materials of the main frame. Incidentally, the space provided rearward of the head pipe is inevitably further reduced when the reinforcement frame is disposed under the main frame. It is particularly effective to reliably achieve workability when installing the brake hoses in such a structure that causes a reduction of the space in which the mounting work is performed. Thus, the advantageous effects of the preferred embodiments of the present invention are extensively realized in such a structure.

A saddle-ride type vehicle according to a fourteenth aspect of various preferred embodiments of the present invention relates to the saddle-ride type vehicle according to any of the first to thirteenth aspects, and wherein the frame includes a cross tube connected to a rear end portion of the first down frame, a rear end portion of the second down frame, and a rear end portion of the main frame. Further, the fluid pressure control device is disposed in a space defined by the main frame, the first down frame, the second down frame, and the cross tube in the vehicle side view.

According to the saddle-ride type vehicle of the fourteenth aspect of various preferred embodiments of the present invention, the fluid pressure control device is disposed forward of the cross tube. Therefore, the space provided rearward of the head pipe is more effectively utilized in comparison with a structure in which the fluid pressure control device is disposed rearward of the cross tube. Further, the fluid pressure control device is unlikely to interfere with a member disposed above the cross tube.

A saddle-ride type vehicle according to a fifteenth aspect of various preferred embodiments of the present invention relates to the saddle-ride type vehicle according to any of the first to fourteenth aspects, and wherein the fluid pressure control device includes a drive motor. The drive motor is configured to feed the brake fluid to the brake device through the downstream brake hose. Further, the fluid pressure control device is disposed such that the drive motor is located closer to the main frame in the vehicle width direction than the brake hose connecting portion is.

According to the saddle-ride type vehicle of the fifteenth aspect of various preferred embodiments of the present invention, the drive motor, which is a relatively heavy component among the components of the fluid pressure control device, is disposed in a position closer to the vehicle center line. Therefore, a balance of the weight of the vehicle is easily achieved in the vehicle width direction.

A saddle-ride type vehicle according to a sixteenth aspect of various preferred embodiments of the present invention relates to the saddle-ride type vehicle according to any of the third to sixth aspects, and further includes a vehicle component disposed in a position between the main frame and the first down frame, or between the main frame and the second down frame. The position is located in the second region.

According to the saddle-ride type vehicle of the sixteenth aspect of various preferred embodiments of the present invention, the vehicle component is disposed in the second region. Therefore, the space provided rearward of the head pipe is more effectively utilized, while a balance of the weight of the vehicle is adjusted in the vehicle width direction by the fluid pressure control device and the vehicle component.

A saddle-ride type vehicle according to a seventeenth aspect of various preferred embodiments of the present invention relates to the saddle-ride type vehicle according to the sixteenth aspect, and wherein the vehicle component is an electric component.

According to the saddle-ride type vehicle of the seventeenth aspect of various preferred embodiments of the present invention, the electric component is disposed in the second region. Therefore, the space provided rearward of the head pipe is more effectively utilized, while a balance of the weight of the vehicle is adjusted in the right-and-left direction by the fluid pressure control device and the electric component.

According to the preferred embodiments of the present invention, it is possible to provide a saddle-ride type vehicle configured to enhance workability when installing the brake hoses and maintenance performance of an engine.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
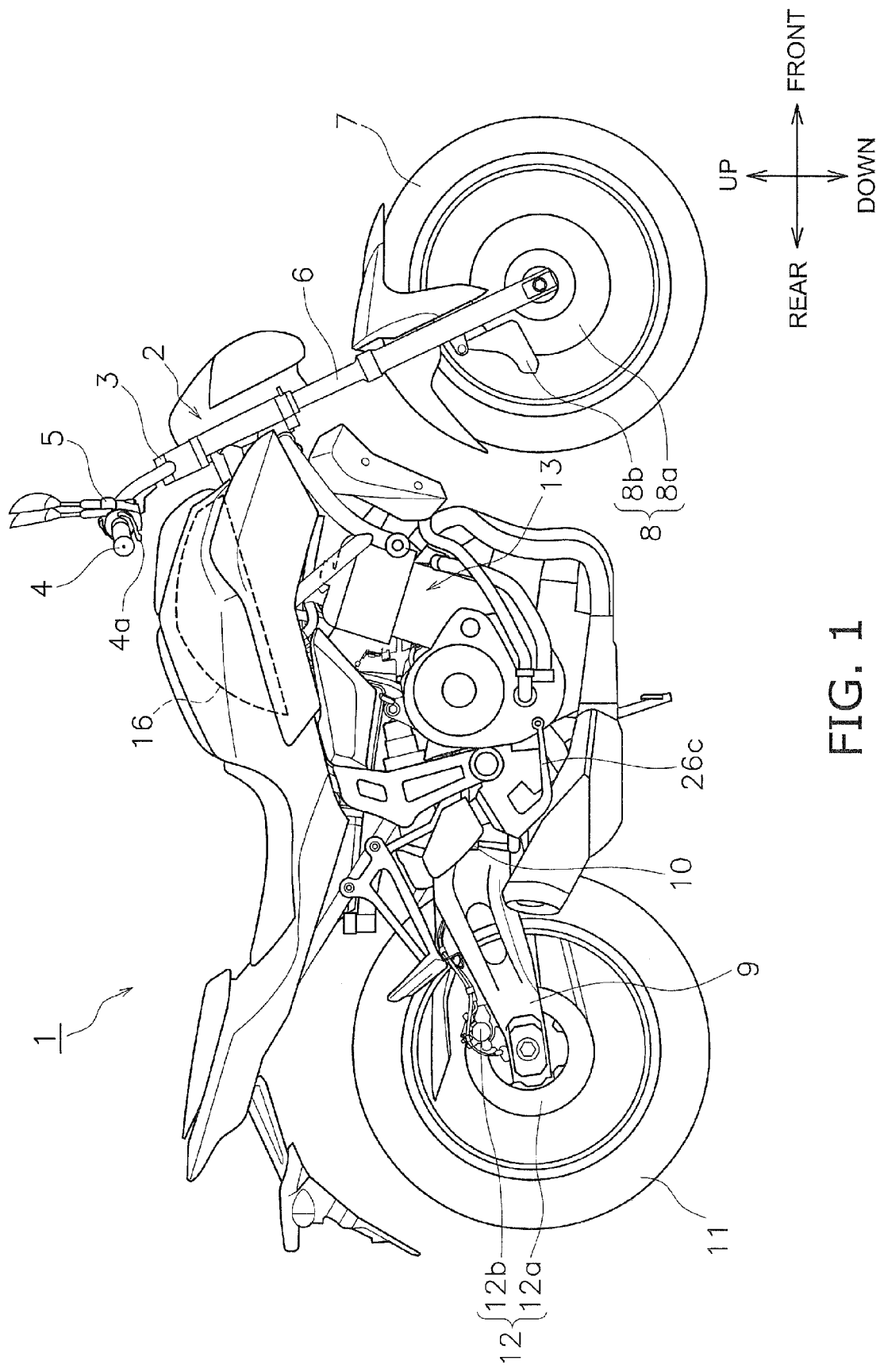
FIG. 1 is a right side view of a saddle-ride type vehicle.
Figure 2:
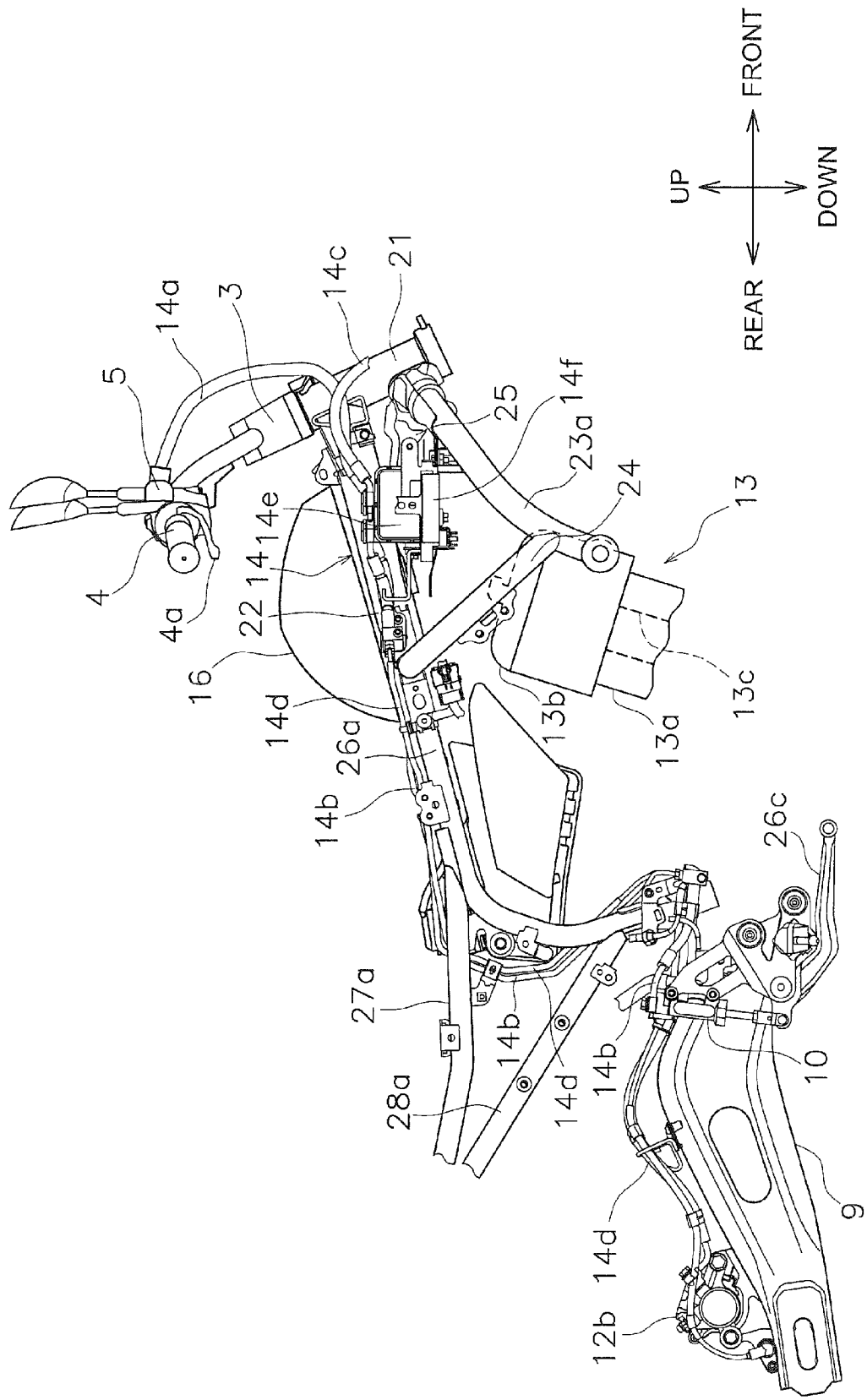
FIG. 2 is a right side view of a frame structure and a brake hose layout.
Figure 3:
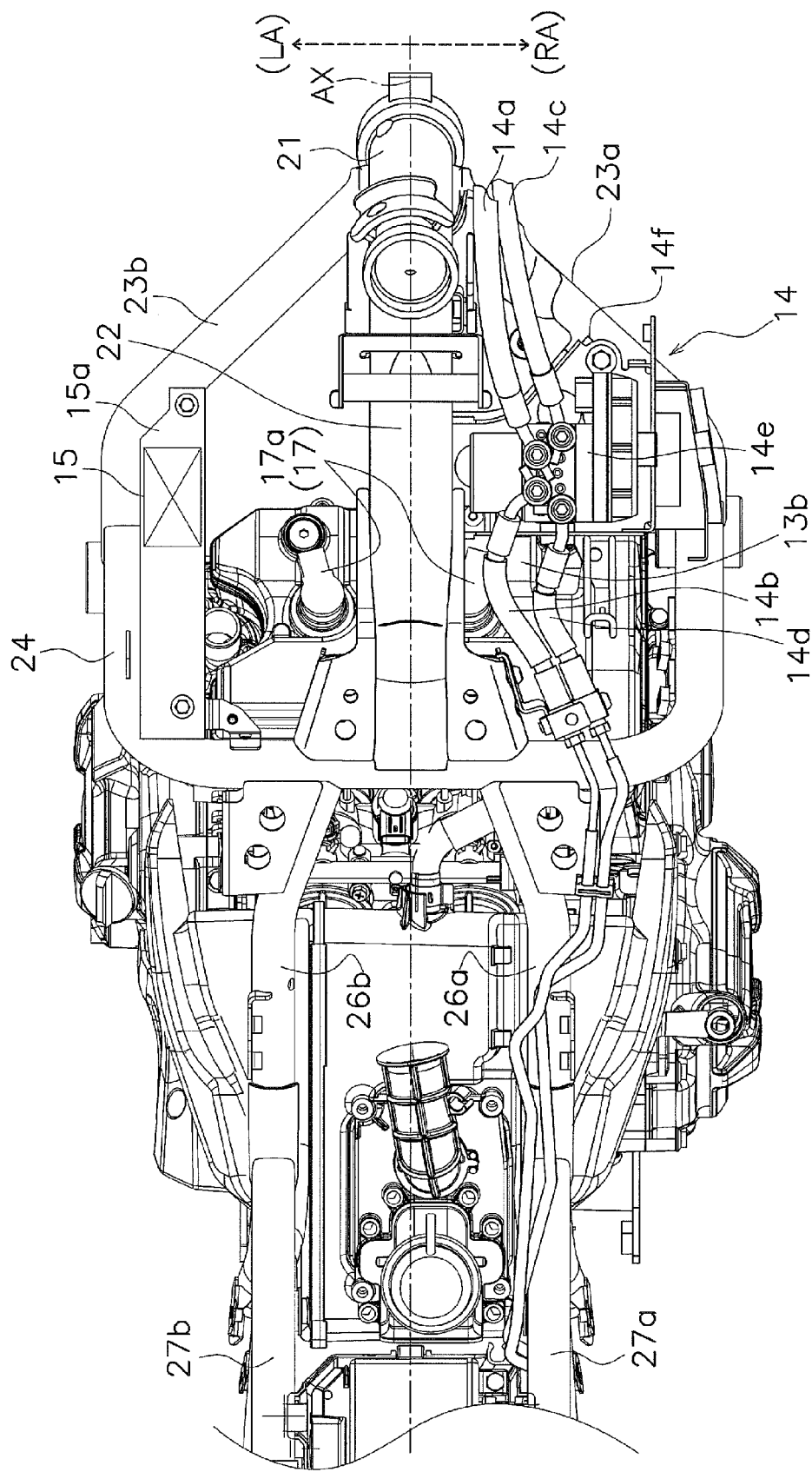
FIG. 3 is a top view of the frame structure and the brake hose layout.
Figure 4:
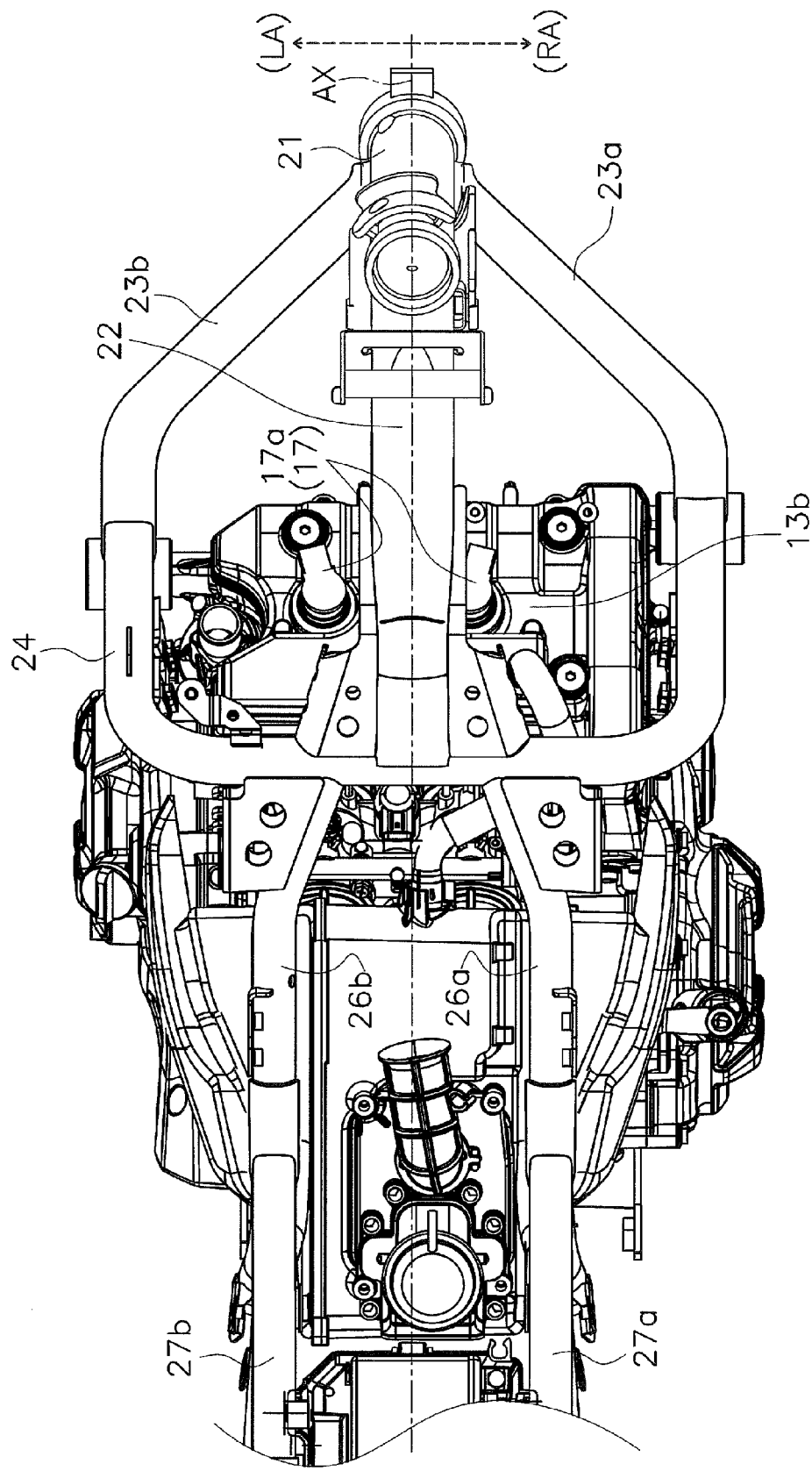
FIG. 4 is a top view of the frame structure and the brake hose layout without illustration of some of the component members in FIG. 3.

With reference to the drawings, explanation will be made of a schematic structure of a saddle-ride type vehicle 1 according to preferred embodiments of the present invention. FIG. 1 is a right side view of the saddle-ride type vehicle 1. FIG. 2 is a right side view of a structure of a frame 2 and a layout of brake hoses. FIG. 3 is a top view of the structure of the frame 2 and the layout of the brake hoses. FIG. 4 is a top view of the structure of the frame 2 and the layout of the brake hoses without illustration of some of the component members in FIG. 3. In the preferred embodiments, the terms "front", "rear", "right" and "left" are defined based on a forward-view direction of a rider seated on a seat.

The saddle-ride type vehicle 1 is preferably a motorcycle, for example. The saddle-ride type vehicle 1 includes the frame 2, a steering shaft 3, a steering handle 4, a front wheel master cylinder 5, a front fork (wheel support device) 6, a front wheel 7, a front wheel brake unit 8, a swing arm (wheel support device) 9, a rear wheel master cylinder 10, a rear wheel 11, a rear wheel brake unit 12, an engine 13, a brake fluid pressure control unit 14, a rectifier regulator 15, and a fuel tank 16.

As illustrated in FIGS. 2 and 3, the frame 2 includes a head pipe 21, a main frame 22, first and second down frames 23a and 23b, a cross tube 24, a reinforcement frame 25, first and second seat pillars 26a and 26b, first and second seat pipes 27a and 27b, and first and second back stays 28a and 28b (note that only the first back stay 28a is illustrated in FIG. 2).

As illustrated in FIG. 3, the head pipe 21 is disposed on a vehicle center line AX extending in the back-and-forth direction of the vehicle. The head pipe 21 extends in the up-and-down direction. The main frame 22 is connected to the head pipe 21. The main frame 22 extends rearwardly from the head pipe 21 on and along the vehicle center line AX. The main frame 22 is located above the engine 13.

The first and second down frames 23a and 23b are respectively connected to the head pipe 21, and are located lower than the main frame 22. The first and second down frames 23a and 23b respectively extend rearward from the head pipe 21. In a top view of the vehicle, the first and second down frames 23a and 23b interpose the main frame 22 therebetween. The first and second down frames 23a and 23b extended so as to be gradually separated away from each other in the vehicle width direction in proportion to the distance rearward from the head pipe 21. The lower end portions of the first and second down frames 23a and 23b are respectively coupled to the front portion of the engine 13.

The cross tube 24 preferably has a U-shaped or substantially U-shaped configuration. The middle portion of the cross tube 24 extends in the vehicle width direction. The rear end portion of the main frame 22 is coupled to the middle portion of the cross tube 24. Both end portions of the cross tube 24 are respectively coupled to the rear end portions of the first and second down frames 23a and 23b. Both end portions of the cross tube 24 are located lower than the middle portion thereof.

The reinforcement frame 25 is disposed under the main frame 22. The reinforcement frame 25 is connected to the head pipe 21 in a position lower than the position that the main frame 22 is connected to the head pipe 21. The reinforcement frame 25 extends rearwardly from the head pipe 21. The rear end portion of the reinforcement frame 25 is coupled to the lower portion of the main frame 22. Thus, the reinforcement frame 25 connects the main frame 22 and the head pipe 21, while being located under the main frame 22.

The first and second seat pillars 26a and 26b are respectively connected to the middle portion of the cross tube 24. The respective first and second seat pillars 26a and 26b extend rearwardly from the cross tube 24, and are then downwardly curved to a great extent. The lower end portions of the first and second seat pillars 26a and 26b are respectively made of sheet metal, for example, and a rear wheel brake pedal 26c is attached thereto.

The first seat pipe 27a extends rearwardly and upwardly from the curved portion of the first seat pillar 26a. The second seat pipe 27b extends rearwardly and upwardly from the curved portion of the second seat pillar 26b. The first back stay 28a extends rearwardly and upwardly from the lower end portion of the first seat pillar 26a. The second back stay 28b extends rearwardly and upwardly from the lower end portion of the second seat pillar 26b. The first back stay 28a is coupled to the rear end portion of the first seat pipe 27a. The second back stay 28b is coupled to the rear end portion of the second seat pipe 27b.

The steering shaft 3 is turnably supported by the head pipe 21. The steering handle 4 is fixed to the upper end portion of the steering shaft 3. A front wheel brake lever 4a is attached to the steering handle 4. The front wheel master cylinder 5 is fixed to the steering handle 4. When the front wheel brake lever 4a is squeezed, the front wheel master cylinder 5 is configured to feed brake fluid to the brake fluid pressure control unit 14.

The front fork 6 is turnably supported by the steering shaft 3 and is coupled to the steering shaft 3 through a bracket. The front wheel 7 is rotatably attached to the lower end portion of the front fork 6. The front wheel 7 is disposed in the front portion of the vehicle and is supported by the front fork 6.

The front wheel brake unit 8 includes a front wheel brake disc 8a and a front wheel brake caliper (brake device) 8b. The front wheel brake disc 8a is fixed to the front wheel 7. The front wheel brake caliper 8b is fixed to the front fork 6. The front wheel brake caliper 8b is configured to press a friction member onto the front wheel brake disc 8a due to fluid pressure of the brake fluid in order to brake the front wheel brake disc 8a.

The swing arm 9 is supported by the first and second seat pillars 26a and 26b so as to be pivotable up and down. The swing arm 9 extends rearwardly from the respective lower end portions of the first and second seat pillars 26a and 26b. The rear wheel 11 is rotatably supported by the rear end portion of the swing arm 9.

The rear wheel master cylinder 10 is fixed to the first and second seat pillars 26a and 26b. When the rear wheel brake pedal 26c is pressed down, the rear wheel master cylinder 10 is configured to feed the brake fluid to the brake fluid pressure control unit 14.

The rear wheel 11 is disposed in the rear portion of the vehicle and is supported by the frame 2 through the swing arm 9. The rear wheel brake unit 12 includes a rear wheel brake disc 12a and a rear wheel brake caliper (brake device) 12b. The rear wheel brake disc 12a is fixed to the rear wheel 11. The rear wheel brake caliper 12b is fixed to the swing arm 9. The rear wheel brake caliper 12b is configured to press a friction member onto the rear wheel brake disc 12a due to the fluid pressure of the brake fluid in order to brake the rear wheel brake disc 12a.

The engine 13 is disposed rearward of the front wheel 7. The engine 13 is suspended from the first and second down frames 23a and 23b and the first and second seat pillars 26a and 26b. The engine 13 includes a cylinder block 13a and an engine head cover 13b. Two cylinders 13a, for example, are located inside the cylinder block 13a, and are disposed at an interval in the vehicle width direction.

Figure 5:
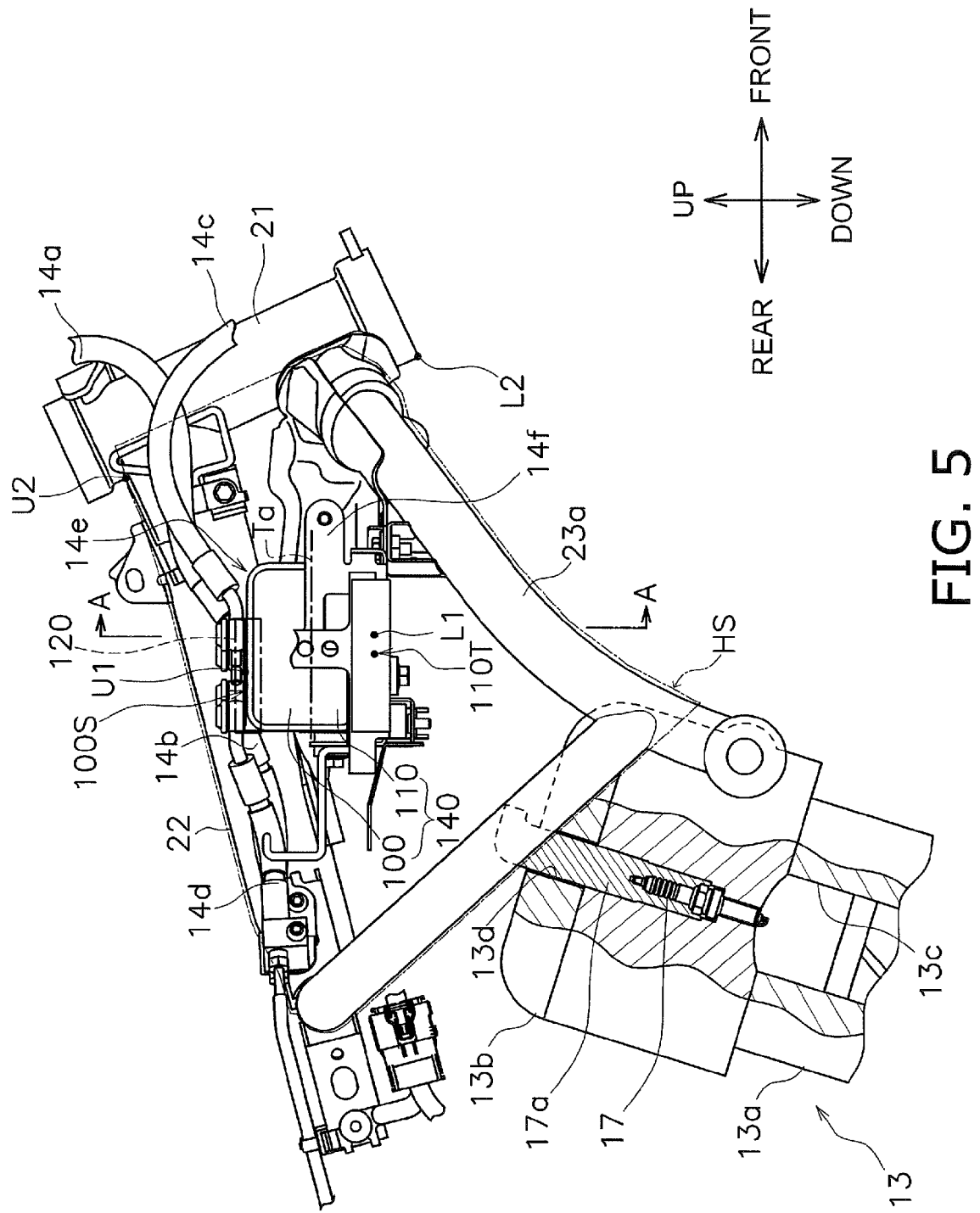
FIG. 5 is a partial enlarged view of FIG. 2.

FIG. 5 is a partial enlarged view of FIG. 2. The engine head cover 13b is disposed on the cylinder block 13a. In other words, the engine head cover 13b is located in the upper portion of the engine 13.

Two plug holes 13d are bored in the top surface of the engine head cover 13b so as to be paired with the cylinders 13c. Each plug hole 13d extends from the top surface of the engine head cover 13d toward its paired cylinder 13c. A plug 17 is attached to the bottom portion of each plug hole 13d. Further, a plug cap 17a is attached to the upper portion of each plug 17.

As illustrated in FIGS. 2 and 3, the brake fluid pressure control unit 14 includes a first brake hose (upstream brake hose) 14a, a second brake hose (upstream brake hose) 14b, a third brake hose (downstream brake hose) 14c, a fourth brake hose (downstream brake hose) 14d, a fluid pressure control device 14e, and a support bracket 14f. The first to fourth brake hoses 14a to 14d contain the brake fluid sealed therein.

The first brake hose 14a is connected to the front wheel master cylinder 5 and the fluid pressure control device 14e. The second brake hose 14b is connected to the rear wheel master cylinder 10 and the fluid pressure control device 14e. The third brake hose 14c is connected to the front wheel brake caliper 8b and the fluid pressure control device 14e. The fourth brake hose 14d is connected to the rear wheel brake caliper 12b and the fluid pressure control device 14e.

As illustrated in FIGS. 3 and 4, where the saddle-ride type vehicle 1 is herein divided right and left into two regions with reference to the vehicle center line AX in a top view of the vehicle, the right-side one of the divided regions is defined as a right-side region (first region) RA while the left-side one of the divided regions is defined as a left-side region (second region) LA. The first brake hose 14a is disposed in the right-side region RA in which the front wheel brake caliper 8b and the fluid pressure control device 14e are also disposed. Likewise, the third brake hose 14c is disposed in the right-side region RA. On the other hand, the second brake hose 14b is disposed in the right-side region RA in which the rear wheel brake caliper 12b and the fluid pressure control device 14e are also disposed. Likewise, the fourth brake hose 14d is disposed in the right-side region RA.

The fluid pressure control device 14e is disposed in a position higher than the engine 13. The fluid pressure control device 14e is disposed in a space provided rearward of the head pipe 21. The fluid pressure control device 14e is disposed in the right-side region RA in which the front wheel brake caliper 8b is also disposed. The fluid pressure control device 14e is disposed in the right-side region RA in which the rear wheel brake caliper 12b is also disposed.

The fluid pressure control device 14e is supported on the support bracket 14f. The support bracket 14f is fixed to the reinforcement frame 25 and the first down frame 23a. The fluid pressure control device 14e is configured to regulate the fluid pressure of the brake fluid to be fed to the front wheel brake caliper 8b and the rear wheel brake caliper 12b in order to perform antilock brake control for the front wheel brake caliper 8b and the rear wheel brake caliper 12b. Explanation will be made below for the structure and arrangement of the fluid pressure control device 14e.

The rectifier regulator 15 is disposed in the left-side region LA. The rectifier regulator 15 is fixed to the cross tube 24 and the second down frame 23b through a stay 15a. However, the rectifier regulator 15 may be alternatively fixed to the second down frame 23b and/or the reinforcement frame 25.

The fuel tank 16 stores fuel to be supplied to the engine 13. The fuel tank 16 is disposed above the fluid pressure control device 14e, the main frame 22, and the cross tube 24.

Figure 6:
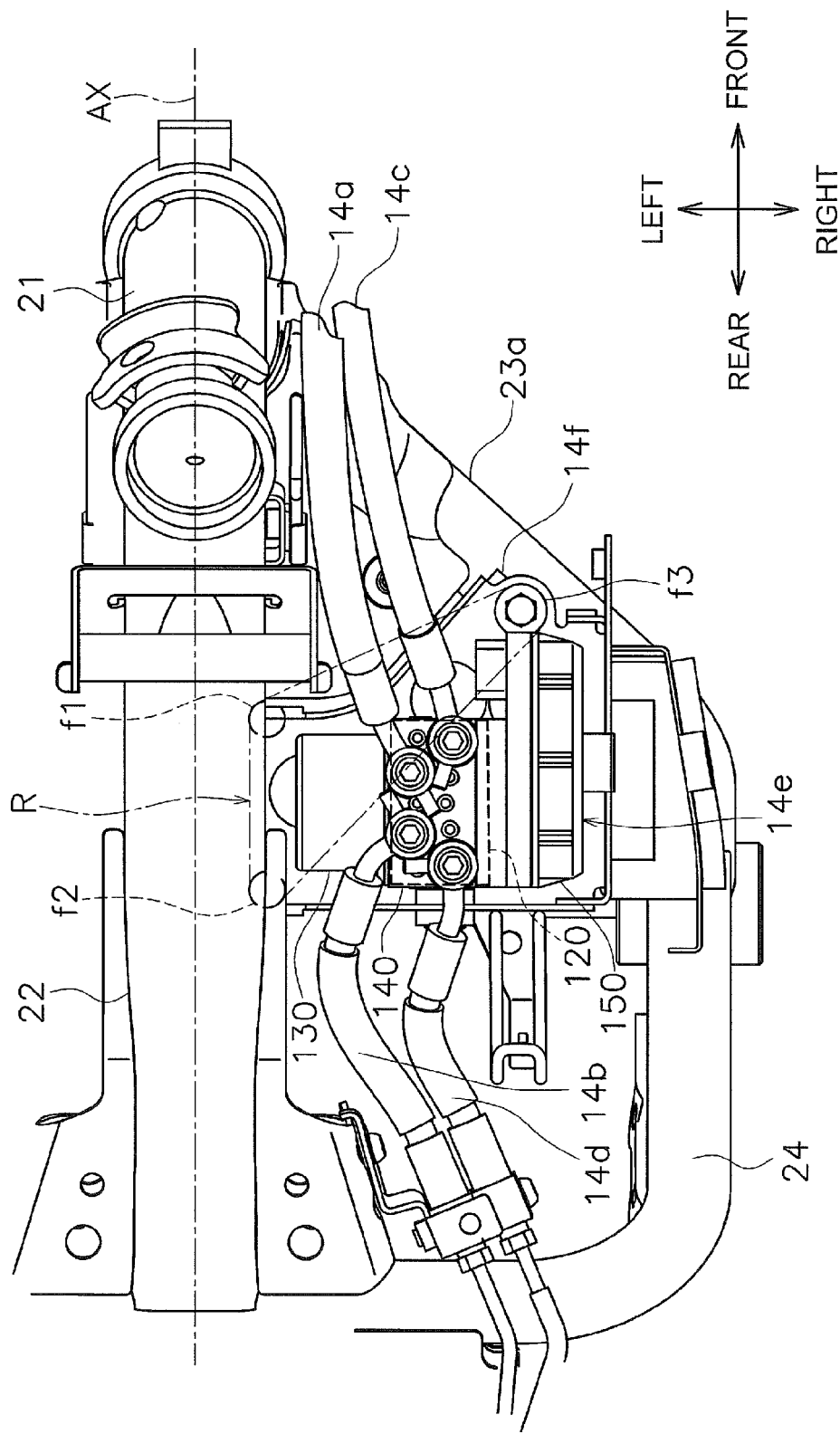
FIG. 6 is a partial enlarged view of FIG. 3.
Figure 7:
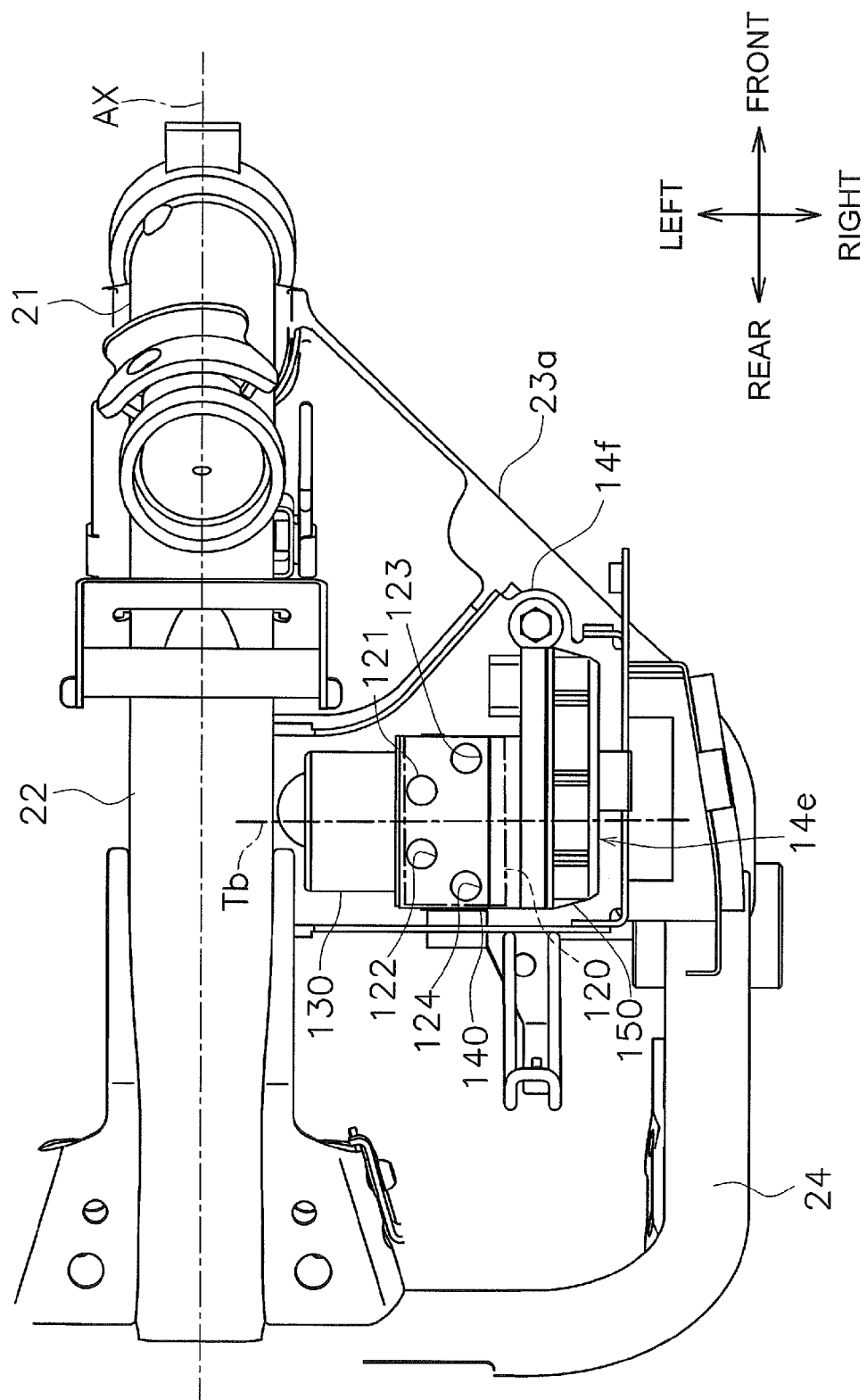
FIG. 7 is a top view of a fluid pressure control device from which the brake hoses are disconnected.

FIG. 6 is a partial enlarged view of FIG. 3. FIG. 7 is a top view of the fluid pressure control device 14e from which the first to fourth brake hoses 14a to 14d are disconnected.

The fluid pressure control device 14e includes a drive motor 130, a brake fluid flow path unit 140, and a control unit 150. The drive motor 130, the brake fluid flow path unit 140, and the control unit 150 are disposed, in this order, along the vehicle width direction so as to be spaced away from the main frame 22 (i.e., to the right).

The drive motor 130 is configured to pressure-feed the brake fluid to the third brake hose 14c and the fourth brake hose 14d.

The brake fluid flow path unit 140 includes brake fluid flow paths inside thereof. The first to fourth brake hoses 14a to 14d are connected to the brake fluid flow path unit 140.

The control unit 150 is connected to the brake fluid flow path unit 140. The control unit 150 is configured to control the drive motor 130 based on rotation of the front wheel 7 and that of the rear wheel 11 in order to control the brake fluid pressures within the third and fourth brake hoses 14c and 14d.

As illustrated in FIG. 5, the fluid pressure control device 14e overlaps with the main frame 22 in a side view of the vehicle. In the vehicle side view, the fluid pressure control device 14e is disposed in a space HS defined by the outer edge of the main frame 22, of the first down frame 23a, of the second down frame 23b, and of the cross tube 24. The lower end (L1) of the fluid pressure control device 14e is located higher than the lower end (L2) of the head pipe 21. The upper end (U1) of the fluid pressure control device 14e is located lower than the upper end (U2) of the main frame 22.

As illustrated in FIG. 6, the fluid pressure control device 14e is disposed between the main frame 22 and the first down frame 23a in the vehicle top view. When described in more detail, the fluid pressure control device 14e is disposed between the right end edge of the main frame 22 and that of the first down frame 23a in the vehicle top view. The fluid pressure control device 14e is disposed on the support bracket 14f. The support bracket 14f includes first to third fixing portions f1 to f3. The first fixing portion f1 is fixed to the reinforcement frame 25. The second fixing portion f2 is fixed to the reinforcement frame 25 and is located rearward of the first fixing portion f1. The third fixing portion f3 is fixed to the first down frame 23a. The drive motor 130 is disposed in a triangle region R defined by the first to third fixing portions f1 to f3.

As illustrated in FIG. 5, the brake fluid flow path unit 140 includes an upper portion 100 and a lower portion 110. The upper portion 100 is located higher than a middle Ta of the brake fluid flow path unit 140 in the up-and-down direction (i.e., a middle position between the upper end U1 and the lower end L1). The upper portion 100 includes a top surface 100S on which the upper end U1 is located. The top surface 100S is located lower than the upper end U2 of the main frame 22. The lower portion 110 is located lower than the middle Ta of the brake fluid flow path unit 140 in the up-and-down direction. The lower portion 110 includes a bottom surface 110T on which the lower end L1 is located. The bottom surface 110T is located higher than the lower end L2 of the head pipe 21. It should be noted that in the present exemplary preferred embodiment, only the upper portion 100 overlaps with the main frame 22 in the vehicle side view. However, the lower portion 110 may also partially overlap with the main frame 22 in the vehicle side view.

As illustrated in FIGS. 5 to 7, the brake fluid flow path unit 140 includes a brake hose connecting portion 120 to which the first to fourth brake hoses 14a to 14d are connected. In the present exemplary preferred embodiment, the brake hose connecting portion 120 is entirely included in the upper portion 100. However, the brake hose connecting portion 120 may be partially included in the lower portion 110.

As illustrated in FIG. 7, the brake hose connecting portion 120 preferably includes four attachment holes 121 to 124, for example. The first brake hose 14a is connected to the attachment hole 121 (second attachment hole). The second brake hose 14b is connected to the attachment hole 122 (first attachment hole). The third brake hose 14c is connected to the attachment hole 123 (second attachment hole). The fourth brake hose 14d is connected to the attachment hole 124 (first attachment hole). Further, the attachment hole 122 is located rearward of a middle Tb of the brake fluid flow path unit 140 in the vehicle back-and-forth direction. Likewise, the attachment hole 124 is located rearward of the middle Tb of the brake fluid flow path unit 140 the vehicle back-and-forth direction. On the other hand, the attachment hole 121 is located forward of the middle Tb of the brake fluid flow path unit 140 in the vehicle back-and-forth direction. Likewise, the attachment hole 123 is located forward of the middle Tb of the brake fluid flow path unit 140 in the vehicle back-and-forth direction.

Figure 8:
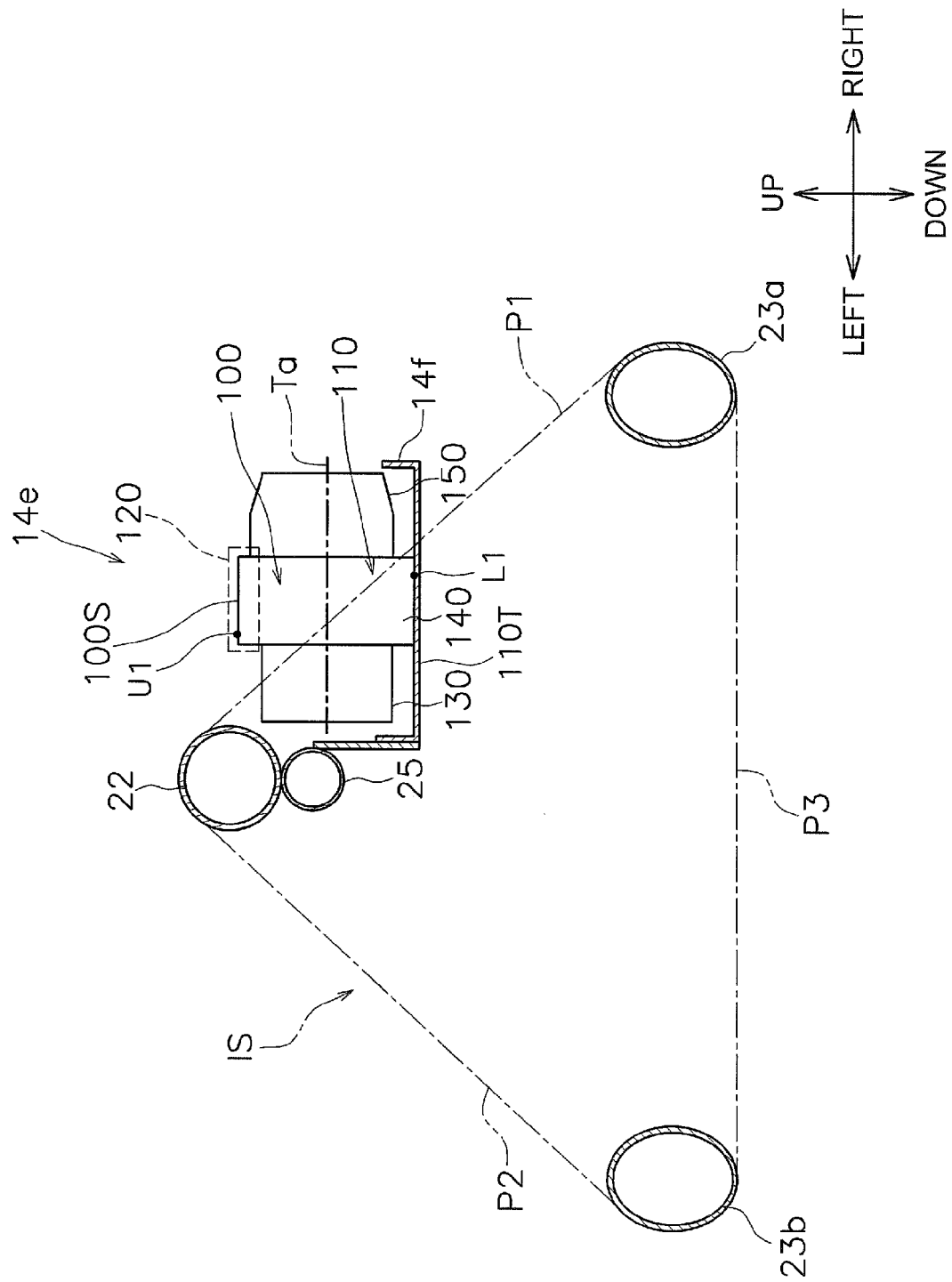
FIG. 8 is a cross-sectional view of FIG. 5 taken along a line A-A.

FIG. 8 is a cross-sectional view of FIG. 5 taken along a line A-A. FIG. 8 is an exemplary cross-section taken perpendicular to the vehicle back-and-forth direction. The fluid pressure control device 14e is partially disposed in a space IS defined by the main frame 22, the first down frame 23a, and the second down frame 23b. Specifically, each of the upper and lower portions 100 and 110 is partially disposed in the space IS. On the other hand, the brake hose connecting portion 120 of the fluid pressure control device 14e is disposed outside the space IS. The space IS is enclosed by the outer edge of the main frame 22, of the first down frame 23a, of the second down frame 23b, and three planes P1 to P3 defined by connecting the respective outer edges of the frames 22, 23a, and 23b to each other. FIG. 8 illustrates cross-sections of the three planes P1 to P3.

As illustrated in FIG. 8, the fluid pressure control device 14e is partially disposed in the space IS. It is thus possible to effectively utilize the space IS provided rearward of the head pipe 21.

As illustrated in FIG. 8, the brake hose connecting portion 120 is disposed outside the space IS. In other words, the brake hose connecting portion 120 is exposed to the outside of the space IS. It is thus possible to enhance workability in disposing the first to fourth brake hoses 14a to 14d. Specifically, the first to fourth brake hoses 14a to 14d are easily held and handled in the surrounding of the frame 2, while the brake hose connecting portion 120 is easily accessible by a tool. Therefore, it is easy to connect the brake hoses 14a to 14d to the brake hose connecting portion 120.

As illustrated in FIG. 6, the fluid pressure control device 14e is disposed between the main frame 22 and the first down frame 23a in the vehicle top view. It is thus easy to dispose the fluid pressure control device 14e at a high position even when using the structure in which the single main frame 22 extends straight rearward from the head pipe 21, as in the present exemplary preferred embodiment. Thus, as illustrated in FIG. 5, the structure is implemented such that the fluid pressure control device 14e is disposed at a high position so as to overlap with the main frame 22 in the vehicle side view. As a result, a large clearance is provided between the fluid pressure control device 14e and the engine 13. It is thus possible to reliably achieve good accessibility to the upper portion of the engine 13. In other words, maintenance performance of the engine 13 is enhanced.

The fluid pressure control device 14e includes the plug caps 17a and the plugs 17 disposed in the upper portion of the engine 13. A space is reliably provided above the plug caps 17a and the plugs 17. It is thus possible to achieve good accessibility to the plug caps 17a and the plugs 17. When described in more detail, the plug caps 17a and the plugs 17 are easily accessible from above or laterally of the upper portion of the engine 13 by a tool or the hands of a worker. In other words, good maintenance performance of the engine 13 is achieved. For example, when a work of detaching one of the plugs 17 is performed, it is easy to approach the tool or the hands of a worker to the relevant plug cap 17a or a plug wrench in all the following steps of: upwardly detaching the plug cap 17a; inserting the plug wrench into the relevant plug hole 13d from above the upper portion of the engine 13 and covering the plug 17 with the plug wrench; approaching the tool to the plug wrench from above or lateral of the upper portion of the engine 13 and fitting the tool to the plug wrench; and removing the plug 17 by turning the plug wrench. This is also true for a work of attaching the plug 17. Therefore, maintenance performance of the engine 13 is enhanced. It should be noted that a space is also provided above the engine head cover 13b and engine attachment members such as bolts that fasten the engine head cover 13b to the cylinder block 13a. It is thus possible to achieve good accessibility to the upper portion of the engine 13. In other words, maintenance performance of the engine 13 is enhanced.

The rear wheel brake caliper 12b and the fluid pressure control device 14e are disposed in the same region, i.e., the right-side region RA. Thus, the fourth brake hose 14d is not required to be mounted astride the main frame 22 when connecting the fourth brake hose 14d to the rear wheel brake caliper 12b and the fluid pressure control device 14e. Therefore, it is easy to dispose the fourth brake hose 14d. Likewise, the rear wheel master cylinder 10 is disposed in the same region (i.e., the right-side region RA) as the fluid pressure control device 14e. Therefore, it is easy to dispose the second brake hose 14b.

The fourth brake hose 14d is disposed in the same region (i.e., the right-side region RA) as the rear wheel brake caliper 12b. Therefore, an increase in the entire length of the fourth brake hose 14d is further prevented in comparison with a structure in which the fourth brake hose 14d is mounted astride the main frame 22. Likewise, the second brake hose 14b is disposed in the same region (i.e., the right-side region RA) as the fluid pressure control device 14e. Therefore, an increase in the entire length of the second brake hose 14b is prevented.

The brake hose connecting portion 120 includes the attachment hole 124 (an exemplary first attachment hole) to which the fourth brake hose 14d is connected. The attachment hole 124 is located rearward of the middle Tb of the brake hose connecting portion 120 in the vehicle back-and-forth direction. Thus, the fourth brake hose 14d is unlikely to interfere with the fluid pressure control device 14e, the second brake hose 14b, and the third brake hose 14c in comparison with a structure in which the attachment hole 124 is located forward of the middle Tb of the brake hose connecting portion 120 in the vehicle back-and-forth direction. Therefore, it is easy to dispose the fourth brake hose 14d. Further, an increase in the entire length of the fourth brake hose 14d is prevented. This is also true for the second brake hose 14b.

The front wheel brake caliper 8b and the fluid pressure control device 14e are disposed in the right-side region RA. Thus, the third brake hose 14c is not required to be mounted astride the main frame 22 when connecting the third brake hose 14c to the front wheel brake caliper 8b and the fluid pressure control device 14e. Therefore, it is easy to dispose the third brake hose 14c. Likewise, the front wheel master cylinder 5 is disposed in the same region (i.e., the right-side region RA) as the fluid pressure control device 14e. Therefore, it is easy to dispose the first brake hose 14a.

The third brake hose 14c is disposed in the same region (i.e., the right-side region RA) as the front wheel brake caliper 8b. Therefore, an increase in the entire length of the third brake hose 14c is further prevented in comparison with a structure in which the third brake hose 14c is mounted astride the main frame 22. Likewise, the first brake hose 14a is disposed in the same region (i.e., the right-side region RA) as the fluid pressure control device 14e. Therefore, an increase in the entire length of the first brake hose 14a is prevented.

The brake hose connecting portion 120 includes the attachment hole 123 (an exemplary second attachment hole) to which the third brake hose 14c is connected. The attachment hole 123 is located forward of the middle Tb of the brake hose connecting portion 120 in the vehicle back-and-forth direction. Thus, the third brake hose 14c is unlikely to interfere with the profile of the fluid pressure control device 14e, the first brake hose 14a, and the fourth brake hose 14d in comparison with a structure in which the attachment hole 123 is located rearward of the middle Tb of the brake hose connecting portion 120 in the vehicle back-and-forth direction. Therefore, it is easy dispose the third brake hose 14c. Further, an increase in the entire length of the third brake hose 14c is further prevented. This is also true for the first brake hose 14a.

In the vehicle side view, the lower end L1 of the fluid pressure control device 14e is located higher than the lower end L2 of the head pipe 21. Therefore, the fluid pressure control device 14e is disposed at a sufficiently high position. Hence, a larger clearance is provided between the fluid pressure control device 14e and the engine 13.

In a view of the cross-section taken perpendicular to the vehicle back-and-forth direction, the top surface 100S of the fluid pressure control device 14e is located lower than the upper end U2 of the main frame 22. Thus, the fluid pressure control device 14e does not protrude upward of the main frame 22. Therefore, it is not required to avoid interference between the fluid pressure control device 14e and the fuel tank 16. As a result, a reduction in the capacity of the fuel tank 16 is prevented.

The frame 2 includes the reinforcement frame 25 connected to the head pipe 21 and the main frame 22, while being located under the main frame 22. Thus, it is possible to relatively reduce the strength required for the main frame 22 by providing the reinforcement frame 25. It is thus possible to enhance the flexibility in the design of the shapes and materials of the main frame 22. Incidentally, the space IS provided rearward of the head pipe 21 is inevitably further reduced when the reinforcement frame 25 is disposed under the main frame 22. It is particularly effective to reliably achieve workability in disposing the first to fourth brake hoses 14a to 14d in such a structure that causes a reduction of the space IS in which the disposing work is performed. Thus, the advantageous effects of the preferred embodiments of the present invention are extensively realized in such a structure.

In the vehicle side view, the fluid pressure control device 14e is disposed in the space HS defined by the main frame 22, the first down frame 23a, the second down frame 23b, and the cross tube 24. Thus, the fluid pressure control device 14e is disposed forward of the cross tube 24. The space IS is more effectively utilized in comparison with a structure in which the fluid pressure control device 14e is disposed rearward of the cross tube 24. Further, the fluid pressure control device 14e does not interfere with the fuel tank 16 disposed above the cross tube 24.

The drive motor 130, which is a relatively heavy component among the components of the fluid pressure control device 14e, is disposed in a position close to the vehicle center line AX. Therefore, a balance of the weight of the saddle-ride type vehicle 1 is easily achieved in the right-and-left (vehicle width) direction. Further, the drive motor 130 is disposed above the triangle region R defined by the first to third fixing portions f1 to f3 of the support bracket 14f. Therefore, the relatively heavy drive motor 130 is rigidly supported by the support bracket 14f.

The rectifier regulator 15 is disposed in the left-side region LA located opposite to the right-side region RA. On the other hand, the fluid pressure control device 14e is disposed in the right-side region RA. Therefore, the space IS provided rearward of the head pipe 21 is more effectively utilized, while a balance of the weight of the saddle-ride type vehicle 1 is adjusted in the right-and-left direction by the fluid pressure control device 14e and the rectifier regulator 15.

Preferred embodiments of the present invention have been described above. However, the present invention is not limited by the description and the drawings, which form a part of this disclosure. A variety of alternative preferred embodiments, practical examples, and operational techniques are included within the scope of the present invention.

In the preferred embodiments of the present invention described above, the front wheel brake caliper 8b and the rear wheel brake caliper 12b preferably are both of a disc type, but may be of a drum type.

In the preferred embodiments of the present invention described above, the front wheel master cylinder 5, the front wheel brake caliper 8b, the rear wheel master cylinder 10, the rear wheel brake caliper 12b, and the fluid pressure control device 14e preferably are respectively designed to be disposed in the right-side region RA defined on the right side of the vehicle center line AX. However, all or some of the aforementioned components may be disposed in the left-side region LA defined on the left side of the vehicle center line AX. Therefore, the fluid pressure control device 14e may be disposed between (the left end edge of) the main frame 22 and (the left end edge of) the second down frame 23b in the vehicle top view, although the fluid pressure control device 14e is designed to be disposed between the main frame 22 and the first down frame 23a in the preferred embodiments of the present invention described above.

In the preferred embodiments of the present invention described above, the rectifier regulator 15 preferably is disposed between the main frame 22 and the second down frame 23b. However, other electric components (e.g., a variety of harnesses, relays, etc.) may be disposed therebetween. Further, these electric components may be disposed in positions closer to the main frame 22 than to the rectifier regulator 15 within the left-side region LA. Yet further, similar advantageous effects are achieved even when vehicle components (e.g., a throttle wire) other than these electric components are included.

In the preferred embodiments of the present invention described above, the brake fluid pressure control unit 14 preferably is designed to include the first to fourth brake hoses 14a to 14d. However, the number of brake hoses included in the brake fluid pressure control unit 14 is not particularly limited as long as it includes a plurality of brake hoses. For example, the brake fluid pressure control unit 14 may include only the two brake hoses 14a and 14c for the front wheel brake, or alternatively, may include only the two brake hoses 14b and 14d for the rear wheel brake. Yet alternatively, the brake fluid pressure control unit 14 may include five or more brake hoses.

In the preferred embodiments of the present invention described above, a motorcycle has been referred to as a non-limiting example of a saddle-ride type vehicle. However, the saddle-ride type vehicle may include a vehicle equipped with three or more wheels such as an all-terrain vehicle, a snow mobile and so forth. Further, the motorcycle may include an off-road motorcycle, an on-road motorcycle, and a moped as well as a scooter.

Thus, the present invention is broad enough to encompass a wide variety of preferred embodiments, and modifications and combinations thereof, that are not specifically described in detail in this disclosure. Therefore, the technical scope of the present invention should be defined only by the appended claims.

According to the preferred embodiments of the present invention, it is possible to enhance workability when disposing brake hoses and maintenance performance of an engine. Hence, preferred embodiments of the present invention are useful in the field of saddle-ride type vehicles for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle-ride type vehicle comprising:
   a frame;
   an engine supported by the frame;
   a wheel support device coupled to the frame;
   a wheel rotatably supported by the wheel support device;
   an upstream brake hose and a downstream brake hose respectively containing a brake fluid sealed therein;
   a brake device mounted to the wheel support device, the brake device being configured to brake the wheel by the brake fluid being fed thereto from the downstream brake hose;
   a master cylinder configured to feed the brake fluid to the upstream brake hose; and
   a fluid pressure control device including a brake hose connecting portion to which the upstream and downstream brake hoses are connected, the fluid pressure control device being configured to control a fluid pressure of the brake fluid in the downstream brake hose; wherein
   the frame includes a head pipe, a main frame, a first down frame, and a second down frame, the head pipe extends in an up-and-down direction, the main frame extends rearward from the head pipe, the first and second down frames respectively extend rearward from the head pipe and under the main frame, and the main frame is disposed between the first down frame and the second down frame in a vehicle top view;
   the fluid pressure control device is disposed either between the main frame and the first down frame, or between the main frame and the second down frame in the vehicle top view;
   the fluid pressure control device at least partially overlaps with the main frame in a vehicle side view;
   the fluid pressure control device is partially disposed in a space defined by the main frame, the first down frame, and the second down frame; and
   the brake hose connecting portion is located outside of the space.

2. The saddle-ride type vehicle recited in claim 1, further comprising an engine attachment member attached to an upper portion of the engine.

3. The saddle-ride type vehicle recited in claim 1, wherein the vehicle is divided into a first region and a second region in a vehicle width direction with respect to a vehicle center line extending in a vehicle back-and-forth direction in the vehicle top view, and the brake device and the fluid pressure control device are disposed in the first region.

4. The saddle-ride type vehicle recited in claim 3, wherein the downstream brake hose is disposed in the first region.

5. The saddle-ride type vehicle recited in claim 1, wherein the vehicle is divided into a first region and a second region in a vehicle width direction with respect to a vehicle center line extending in a vehicle back-and-forth direction in the vehicle top view, and the master cylinder and the fluid pressure control device are disposed in the first region.

6. The saddle-ride type vehicle recited in claim 5, wherein the upstream brake hose is disposed in the first region.

7. The saddle-ride type vehicle recited in claim 1, wherein the wheel is disposed in a rear portion of the vehicle.

8. The saddle-ride type vehicle recited in claim 7, wherein the fluid pressure control device includes a brake fluid flow path unit including the brake hose connecting portion, and a flow path of the brake fluid is inside the brake fluid flow path; and
   the brake hose connecting portion of the fluid pressure control device includes a first attachment hole located rearward of a middle of the brake fluid flow path unit in the vehicle back-and-forth direction, and at least one of the upstream brake hose and the downstream brake hose is connected to the first attachment hole.

9. The saddle-ride type vehicle recited in claim 1, wherein the wheel is disposed in a front portion of the vehicle.

10. The saddle-ride type vehicle recited in claim 9, wherein the fluid pressure control device includes a brake fluid flow path unit including the brake hose connecting portion, and a flow path of the brake fluid is inside the brake fluid flow path; and
    the brake hose connecting portion of the fluid pressure control device includes an attachment hole located forward of a middle of the brake fluid flow path unit in the vehicle back-and-forth direction, and at least one of the upstream brake hose and the downstream brake hose is connected to the second attachment hole.

11. The saddle-ride type vehicle recited in claim 1, wherein a lower end of the fluid pressure control device is located higher than a lower end of the head pipe in the vehicle side view.

12. The saddle-ride type vehicle recited in claim 1, further comprising:
    a fuel tank disposed above the fluid pressure control device and the main frame; wherein
    a top surface of the fluid pressure control device is located lower than an upper end of the main frame in a view of a cross-section taken perpendicular to the vehicle back-and-forth direction.

13. The saddle-ride type vehicle recited in claim 1, further comprising a reinforcement frame connecting the main frame and the head pipe and being located under the main frame.

14. The saddle-ride type vehicle recited in claim 1, wherein the frame includes a cross tube connected to a rear end portion of the first down frame, a rear end portion of the second down frame, and a rear end portion of the main frame; and
    the fluid pressure control device is disposed in a space defined by the main frame, the first down frame, the second down frame, and the cross tube in the vehicle side view.

15. The saddle-ride type vehicle recited in claim 1, wherein the fluid pressure control device includes a drive motor configured to feed the brake fluid to the brake device through the downstream brake hose; and
    the fluid pressure control device is disposed such that the drive motor is located closer to the main frame in the vehicle width direction than the brake hose connecting portion is.

16. The saddle-ride type vehicle recited in claim 3, further comprising a vehicle component disposed in a position between the main frame and the first down frame, or between the main frame and the second down frame, and the position is in the second region.

17. The saddle-ride type vehicle recited in claim 16, wherein the vehicle component is an electric component.

* * * * *